US012647163B2

(12) United States Patent    (10) Patent No.:   US 12,647,163 B2

Khojastepour et al.      (45) Date of Patent:    Jun. 2, 2026

(54) DISTRIBUTED HYBRID BEAMFORMING

(71) Applicant: NEC Laboratories America, Inc.,
Princeton, NJ (US)

(72) Inventors: Mohammad Khojastepour,
Lawrenceville, NJ (US); Nariman Torkzaban, College Park, MD (US)

(73) Assignee: NEC Corporation, Tokyo (JP)

( * ) Notice: Subject to any disclaimer, the term of this patent is extended or adjusted under 35 U.S.C. 154(b) by 325 days.

(21) Appl. No.: 18/483,931

(22) Filed: Oct. 10, 2023

(65) Prior Publication Data

US 2024/0137086 A1    Apr. 25, 2024

Related U.S. Application Data

(60) Provisional application No. 63/460,061, filed on Apr. 18, 2023, provisional application No. 63/420,854, filed on Oct. 31, 2022, provisional application No. 63/414,699, filed on Oct. 10, 2022.

(51) Int. Cl.
   *H04B 7/06*      (2006.01)
   *H04B 7/08*      (2006.01)
(52) U.S. Cl.
   CPC ........... *H04B 7/0617* (2013.01); *H04B 7/086* (2013.01)
(58) Field of Classification Search
   CPC .. H04B 7/0617; H04B 7/086; H04W 52/0235
   See application file for complete search history.

(56) References Cited

U.S. PATENT DOCUMENTS

| | | | |
|---|---|---|---|
| 2017/0272223 A1* | 9/2017 | Kim ...................... | H04B 7/0617 |
| 2018/0040964 A1* | 2/2018 | Benjebbour ............. | H01Q 3/26 |
| 2018/0076881 A1* | 3/2018 | Zhu ....................... | H04B 7/0452 |
| 2018/0212658 A1* | 7/2018 | Miao .................... | H04B 7/0456 |
| 2019/0109629 A1* | 4/2019 | Park ..................... | H04B 7/0868 |
| 2019/0190569 A1* | 6/2019 | Nayeb Nazar ....... | H04B 7/0639 |
| 2019/0229952 A1* | 7/2019 | Sun ...................... | H04B 7/0868 |
| 2019/0305836 A1* | 10/2019 | Kapetanovic ........ | H04B 7/0695 |
| 2020/0076483 A1* | 3/2020 | Zhang ................... | H04L 25/021 |
| 2020/0366356 A1* | 11/2020 | Chen .................... | H04L 25/0204 |
| 2021/0014085 A1* | 1/2021 | Chen .................... | H04L 25/0224 |

(Continued)

OTHER PUBLICATIONS

"Channel Reciprocity Calibration in TDD Hybrid Beamforming Massive MIMO Systems"; Jiang et al.; IEEE Journal of Selected Topics in Signal Processing, vol. 12, No. 3, Jun. 2018 (Year: 2018).*

(Continued)

*Primary Examiner* — Benjamin H Elliott, IV
(74) *Attorney, Agent, or Firm* — Vincent Duffy

(57) ABSTRACT

Transmission methods and systems include calibrating a mismatch between uplink and downlink digital elements of hybrid beamforming transceivers. calibrating a mismatch between uplink and downlink analog elements of the plurality of hybrid beamforming transceivers. Respective downlink channels are estimated between a user equipment and the hybrid beamforming transceivers using respective mismatch calibrations for the digital and analog elements of each of the hybrid beamforming transceivers. Data is transmitted to the user equipment from the hybrid beamforming transceivers using a distributed beamforming pattern based on the estimated downlink channels.

15 Claims, 6 Drawing Sheets

(56)      References Cited

U.S. PATENT DOCUMENTS

| | | | | |
|---|---|---|---|---|
| 2021/0384932 | A1* | 12/2021 | O'Sullivan | H03F 1/42 |
| 2022/0200678 | A1* | 6/2022 | Ciochina | H04B 7/0626 |
| 2022/0271802 | A1* | 8/2022 | Lee | H04B 17/11 |
| 2023/0353309 | A1* | 11/2023 | Raghavan | H04B 17/14 |
| 2024/0137086 | A1* | 4/2024 | Khojastepour | H04B 7/0617 |

OTHER PUBLICATIONS

"A High-Precision Hybrid Analog and Digital Beamforming Transceiver System for 5G Millimeter-Wave Communication"; Zhang et al.; IEEE Access ( vol. 7); Jun. 19, 2019 (Year: 2019).*

"Channel Reciprocity Calibration for Hybrid Beamforming in Distributed MIMO Systems"; Torkzaban et al.; 2023 IEEE Wireless Communications and Networking Conference (Year: 2023).*

"Codebook Design for Composite Beamforming in Next-generation mmWave Systems"; Torkzaban et al.; 2022 IEEE Wireless Communications and Networking Conference (WCNC) (Year: 2022).*

"Hierarchical-Absolute Reciprocity Calibration for Millimeter-Wave Hybrid Beamforming Systems"; Chen et al.; IEEE Transactions on Wireless Communications, vol. 22, No. 5, May 2023 (Year: 2023).*

"Analog/digital/hybrid beamforming for massive MIMO"; Samsung; 3GPP TSG RAN WG1 #85 R1-164018 Nanjing, China May 23-27, 2016 (Year: 2016).*

Vieira et al., "Reciprocity Calibration for Massive MIMO: Proposal, Modeling and Validation", arXiv:1606.05156v3 [cs.IT] Feb. 21, 2017. pp. 1-14.

Torkzaban et al., "Codebook Design for Composite Beamforming in Next-generation mmWave Systems", arXiv:2202.03610v1 [cs.IT] Feb. 8, 2022, pp. 1-6.

Interdonato et al., "Ubiquitous cell-free Massive MIMO communications", EURASIP Journal on Wireless Communications and Networking. Dec. 2019, pp. 1-13.

You et al., "Beam Squint-Aware Integrated Sensing and Communications for Hybrid Massive MIMO LEO Satellite Systems", arXiv:2203.00235v1 [cs.IT] Mar. 1, 2022, pp. 1-15.

Vieira et al., "Reciprocity calibration of Distributed Massive MIMO Access Points for Coherent Operation", In2021 IEEE 32nd Annual International Symposium on Personal, Indoor and Mobile Radio Communications (PIMRC) Sep. 13, 2021, pp. 1-6.

Rogalin et al., "Scalable Synchronization and Reciprocity Calibration for Distributed Multiuser MIMO", arXiv:1310.7001v4 [cs.NI] Apr. 1, 2015, pp. 1-35.

Jiang et al., "Channel reciprocity calibration in TDD hybrid beamforming massive MIMO systems", arXiv:1708.07811v1 [cs.IT] Aug. 25, 2017, pp. 1-10.

Kaltenberger et al., "Relative Channel Reciprocity Calibration in MIMO/TDD Systems", In2010 Future Network & Mobile Summit Jun. 16, 2010, pp. 1-10.

Vieira et al., "Reciprocity calibration methods for Massive MIMO based on antenna coupling", In2014 IEEE Global Communications Conference Dec. 8, 2014, pp. 1-6.

Wei et al., "Calibration of Phase Shifter Network for Hybrid Beamforming in mmWave Massive MIMO Systems", in IEEE Transactions on Signal Processing, Apr. 3, 2020, pp. 1-14.

Chen et al., "Hierarchical-Absolute Reciprocity Calibration for Millimeter-wave Hybrid Beamforming Systems", arXiv:2204.06705v2 [eess.SP] Nov. 2, 2022, pp. 1-37.

* cited by examiner

Input: $s, \mathbf{F} = \mathbf{f}_1, \mathbf{B} = [\mathbf{b}_1, \mathbf{b}_1, \dots, \mathbf{b}_1]$.

1: For $i = 1$ to $N$:

2:     Tx: Send $s$ with digital chain $t_{1n}$ and beamformer $\mathbf{F}$.

3:     Rx: Receive vector $\mathbf{y}'_i$ on all RF chains with beamformer $\mathbf{B}$ according to:

$$\mathbf{y}'_i = \mathbf{R}'_1 \mathbf{B}^T \mathbf{R}'_2 \mathbf{H} \mathbf{T}_2 \mathbf{f}_1 t_{1i} s + z_{DL}$$

4: End For

5: Define $h \doteq \mathbf{b}_1^T \mathbf{R}'_2 \mathbf{H} \mathbf{T}_2 \mathbf{f}_1$. Solve

$$\{t_{1i}, r'_{1i}\}_{i=1}^{N} = \arg \min_{\{t_{1i}, r'_{1i}\}_{i=1}^{N}} \sum_{i=1}^{N} \sum_{j=1}^{N} \left\| y'_{ij} - r'_{1i} h t_{1j} \right\|^2$$

6: Return $\mathbf{T}_1 = \{t_{1i}\}_{i=1}^{N}$, and $\mathbf{R}'_1 = \{r'_{1i}\}_{i=1}^{N}$.

FIG. 3

Input: $s, \mathbf{R}_1, \mathbf{T}_1, \mathbf{R}'_1, \mathbf{T}'_1$, Full-Rank $\mathbf{F}$, Full-Rank $\mathbf{B}$ such that $\mathbf{F} = [\mathbf{f}_1, \mathbf{f}_2, \ldots, \mathbf{f}_M], \mathbf{B} = [\mathbf{b}_1, \mathbf{b}_2, \ldots, \mathbf{b}_M]$ 1: For $\mathbf{f}_i, i = 1$ to $M$:

2:    For $k = 0 \ldots \lceil M/N \rceil - 1:$

3:       Tx: Send $s$ on digital chain $t_{11}$ with beamformer $\mathbf{f}_i$

4:       Rx: Receive $\mathbf{y}'_{ki}$ on all digital chains with beamformer $\mathbf{B}_k = [\mathbf{b}_{1+kN}, \mathbf{b}_{2+kN}, \ldots, \mathbf{b}_{N+kN}]$ according to:

$$\mathbf{y}'_{ki} = \mathbf{R}'_1 \mathbf{B}_k^T \mathbf{R}'_2 \mathbf{H} \mathbf{T}_2 \mathbf{f}_i t_{11} s + \mathbf{z}'_{ki}$$

5:    End For

6: End For

7: Stack the rows of $\mathbf{R}'_1 \mathbf{B}_k$, $k = 1 \ldots \lceil M/N \rceil - 1$ to get $r'_{11} \tilde{\mathbf{B}}$ 8: Obtain $\mathbf{Y}' = r'_{11} \tilde{\mathbf{B}}^T \mathbf{R}'_2 \mathbf{H} \mathbf{T}_2 \mathbf{F} t_{11} s' + \mathbf{Z}'$.

9: Repeat steps 1-6 for the uplink direction and obtain $$\mathbf{Y} = r_{11} \tilde{\mathbf{F}}^T \mathbf{R}_2 \mathbf{H}^T \mathbf{T}'_2 \mathbf{B} t'_{11} s + \mathbf{Z}.$$

10: Let $\beta = r_{11}^{-1} t_{11}^{'-1} / (r_{11}^{'-1} t_{11}^{'-1})$, $\alpha_i = r_{2i} t_{2i}^{-1}$, $\alpha'_i = r'_{2i} t_{2i}^{'-1}$.

11: Obtain matrices $\mathbf{X} \doteq \tilde{\mathbf{B}}^{-T} \tilde{\mathbf{Y}}' \mathbf{F}^{-1}$ and $\mathbf{Z} \doteq \mathbf{B}^{-T} \mathbf{Y}^T \mathbf{F}^{-1}$.

12: Solve

$$\{\alpha_i, \alpha'_i\}_{i=1}^{M} = \arg \min_{\alpha_i, \alpha'_j, i,j \in [M]} \sum_{i=1}^{M} \sum_{j=1}^{M} \|x_{ij} \alpha_j - \beta z_{ij} \alpha'_i\|^2$$

13: Return $\mathbf{R}_2 \mathbf{T}_2^{-1} = diag\{\alpha_i\}_{i=1}^{M}$, $\mathbf{R}'_2 \mathbf{T}_2^{'-1} = diag\{\alpha'_i\}_{i=1}^{M}$

FIG. 4

Input: $s, \mathbf{R}_1, \mathbf{T}_1, \mathbf{R}_1', \mathbf{T}_1'$, Full-Rank $\mathbf{F}$, Full-Rank $\mathbf{B}$ such that
$\mathbf{F} = [\mathbf{f}_1, \mathbf{f}_2, \ldots, \mathbf{f}_M], \mathbf{B}_i = [\mathbf{b}_1, \mathbf{b}_2, \ldots, \mathbf{b}_M], i = 2, 3$ 1: For $\mathbf{f}_i, i = 1$ to $M$:
2:     For $k = 0 \ldots \lceil M/N \rceil - 1$ :
3:       Tx: Send $s$ on digital chain $t_{11}$ with beamformer $\mathbf{f}_i$
4:       Rx2: Receive $\mathbf{y}_{ki}'$ on all digital chains with beamformer
$\mathbf{B}_k = [\mathbf{b}_{1+kN,1}, \mathbf{b}_{2+kN,2}, \ldots, \mathbf{b}_{N+kN}]$ according to:

$$\mathbf{y}_{ki}' = \mathbf{R}_1' \mathbf{B}_k^T \mathbf{R}_2' \mathbf{H} \mathbf{T}_2 \mathbf{f}_i t_{11} s + \mathbf{z}_{ki}'$$

Rx3: Receive $\mathbf{y}_{ki}''$ on all digital chains with beamformer
$\mathbf{B}_k = [\mathbf{b}_{1+kN}, \mathbf{b}_{2+kN}, \ldots, \mathbf{b}_{N+kN}]$ according to:

$$\mathbf{y}_{ki}'' = \mathbf{R}_1' \mathbf{B}_k^T \mathbf{R}_2' \mathbf{H} \mathbf{T}_2 \mathbf{f}_i t_{11} s + \mathbf{z}_{ki}'$$

5:     End For
6: End For
7: Stack the rows of $\mathbf{R}_1' \mathbf{B}_k, k = 1 \ldots \lceil M/N \rceil - 1$ to get $r_{11}' \tilde{\mathbf{B}}$
8: Obtain $\mathbf{Y}' = r_{11}' \tilde{\mathbf{B}}^T \mathbf{R}_2' \mathbf{H} \mathbf{T}_2 \mathbf{F} t_{11} s' + \mathbf{Z}'$.
Obtain $\mathbf{Y}'' = r_{11}'' \tilde{\mathbf{B}}^T \mathbf{R}_2' \mathbf{H} \mathbf{T}_2 \mathbf{F} t_{11} s' + \mathbf{Z}''$.
9: Repeat steps 1-6 for the uplink direction from 2 to 1 and obtain $$\mathbf{Y}_2 = r_{11} \tilde{\mathbf{F}}^T \mathbf{R}_2 \mathbf{H}^T \mathbf{T}_2' \mathbf{B} t_{11}' s + \mathbf{Z}.$$

10: Repeat steps 1-6 for the uplink direction from 3 to 1 and obtain $$\mathbf{Y}_3 = r_{11} \tilde{\mathbf{F}}^T \mathbf{R}_2 \mathbf{H}^T \mathbf{T}_2' \mathbf{B} t_{11}' s + \mathbf{Z}.$$

11: Let $\beta = r_{11}^{-1} t_{11}'^{-1} / (r_{11}'^{-1} t_{11}'^{-1}), \alpha_i = r_{2i} t_{2i}^{-1}, \alpha_i' = r_{2i}' t_{2i}'^{-1}, \alpha_i'' = r_{2i}'' t_{2i}'^{-1}$.
12: Obtain matrices $\mathbf{X} \doteq \tilde{\mathbf{B}}^{-T} \mathbf{Y}' \mathbf{F}^{-1}$ and $\mathbf{Z} \doteq \mathbf{B}^{-T} \tilde{\mathbf{Y}}_2^T \tilde{\mathbf{F}}^{-1}$.
13: Obtain matrices $\doteq \tilde{\mathbf{B}}^{-T} \mathbf{Y}'' \mathbf{F}^{-1}$ and $\doteq \mathbf{B}^{-T} \tilde{\mathbf{Y}}_3^T \tilde{\mathbf{F}}^{-1}$.
14: Solve

$$\{\alpha_i, \alpha_i', \alpha_i''\}_{i=1}^M = \arg \min_{\alpha_i, \alpha_j', i, j \in [M]} \sum_{i=1}^M \sum_{j=1}^M$$

$$\|x_{ij} \alpha_j - \beta z_{ij} \alpha_i'\|^2 + \|u_{ij} \alpha_j - \beta v_{ij} \alpha_i''\|^2$$

15: Return $\mathbf{R}_2 \mathbf{T}_2^{-1} = diag\{\alpha_i\}_{i=1}^M, \mathbf{R}_2' \mathbf{T}_2'^{-1} = diag\{\alpha_i'\}_{i=1}^M, \mathbf{R}_3' \mathbf{T}_3'^{-1} = diag\{\alpha_i''\}_{i=1}^M$

FIG. 6

DISTRIBUTED HYBRID BEAMFORMING

RELATED APPLICATION INFORMATION

This application claims priority to U.S. Patent Application No. 63/414,699, filed on Oct. 10, 2022, to U.S. Patent Application No. 63/420,854, filed on Oct. 31, 2022, and to U.S. Patent Application No. 63/460,061, filed on Apr. 18, 2023, incorporated herein by reference in its entirety.

BACKGROUND

Technical Field

The present invention relates to hybrid beamforming and, more particularly, to hybrid beamforming in distributed systems.

Description of the Related Art

In a distributed network, multiple access points may each have multiple antennas. Beamforming makes use of the interference between emissions from multiple antennas to focus energy on user equipment. As more antennas are used in the transmission of a given signal, the spatial resolution of the resulting beam may increase as well. However, the spatial relationships between antennas in distinct access points may not be known in advance, making a challenge to select the beamforming parameters needed to target a given user equipment.

SUMMARY

A transmission method includes calibrating a mismatch between uplink and downlink digital elements of hybrid beamforming transceivers. calibrating a mismatch between uplink and downlink analog elements of the plurality of hybrid beamforming transceivers. Respective downlink channels are estimated between a user equipment and the hybrid beamforming transceivers using respective mismatch calibrations for the digital and analog elements of each of the hybrid beamforming transceivers. Data is transmitted to the user equipment from the hybrid beamforming transceivers using a distributed beamforming pattern based on the estimated downlink channels.

A transmission system includes a transceiver, a hardware processor, and a memory that stores a computer program. When executed by the hardware processor, the computer program causes the hardware processor to calibrate a mismatch between uplink and downlink digital elements of the transceiver, to calibrate a mismatch between uplink and downlink analog elements of the transceiver, to estimate respective a downlink channel between a user equipment and the transceiver using the mismatch calibrations for the digital and analog elements of the transceiver, and to transmit data to the user equipment with the transceiver, using a beamforming pattern based on the estimated downlink channel.

A hybrid beamforming access point includes a hardware process, a memory that stores a computer program, and a transceiver that has a transmit path with a digital-to-analog converter and a power amplifier and a receive path with a low-noise amplifier and an analog-to-digital converter. When executed by the hardware processor, the computer program causes the hardware processor to calibrate a mismatch between uplink and downlink digital elements of the transceiver, to calibrate a mismatch between uplink and downlink analog elements of the transceiver, to estimate respective a downlink channel between a user equipment and the transceiver using the mismatch calibrations for the digital and analog elements of the transceiver, and to transmit data to the user equipment with the transceiver, using a beamforming pattern based on the estimated downlink channel that coordinates with other hybrid beamforming access points to form a distributed beam pattern.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is pseudo-code for performing digital radio frequency (RF) chain calibration, in accordance with an embodiment of the present invention;

FIG. 4 is pseudo-code for performing analog RF chain calibration, in accordance with an embodiment of the present invention;

FIG. 6 is pseudo-code for performing RF chain calibration across multiple nodes, in accordance with an embodiment of the present invention.

DETAILED DESCRIPTION OF PREFERRED EMBODIMENTS

To perform cooperative beamforming from multiple access points (APs) to a user equipment (UE), downlink channel information to the UE is needed. This downlink channel information is determined by environmental information that affects how radio signals from the APs propagate to the UE. The downlink channel can be determined by estimating the uplink channel from each AP based on uplink pilots. However, the APs will have different phases and gains relative to one another, and these quantities are determined to provide a transformation that makes it possible to relate the uplink channels to one another and to arrive at the downlink channel.

Estimating channel information furthermore imposes an overhead on the system, and this overhead may in some cases outweigh the benefits derived from distributed beamforming. Partial channel estimation may therefore be used in some cases to aid in beamforming. This reduces the estimation overhead, without sacrificing the quality of the channel estimation, maintaining the full beamforming gain.

Timing calibrations may also be needed, particularly in transmission systems that use time domain duplexing (TDD). For example, in a system with two UEs, different APs may have a different time-of-flight to the respective UEs. Calibration may be performed by calibrating digital chains and analog chains in a hybrid system disjointly.

Figures 1, 2:
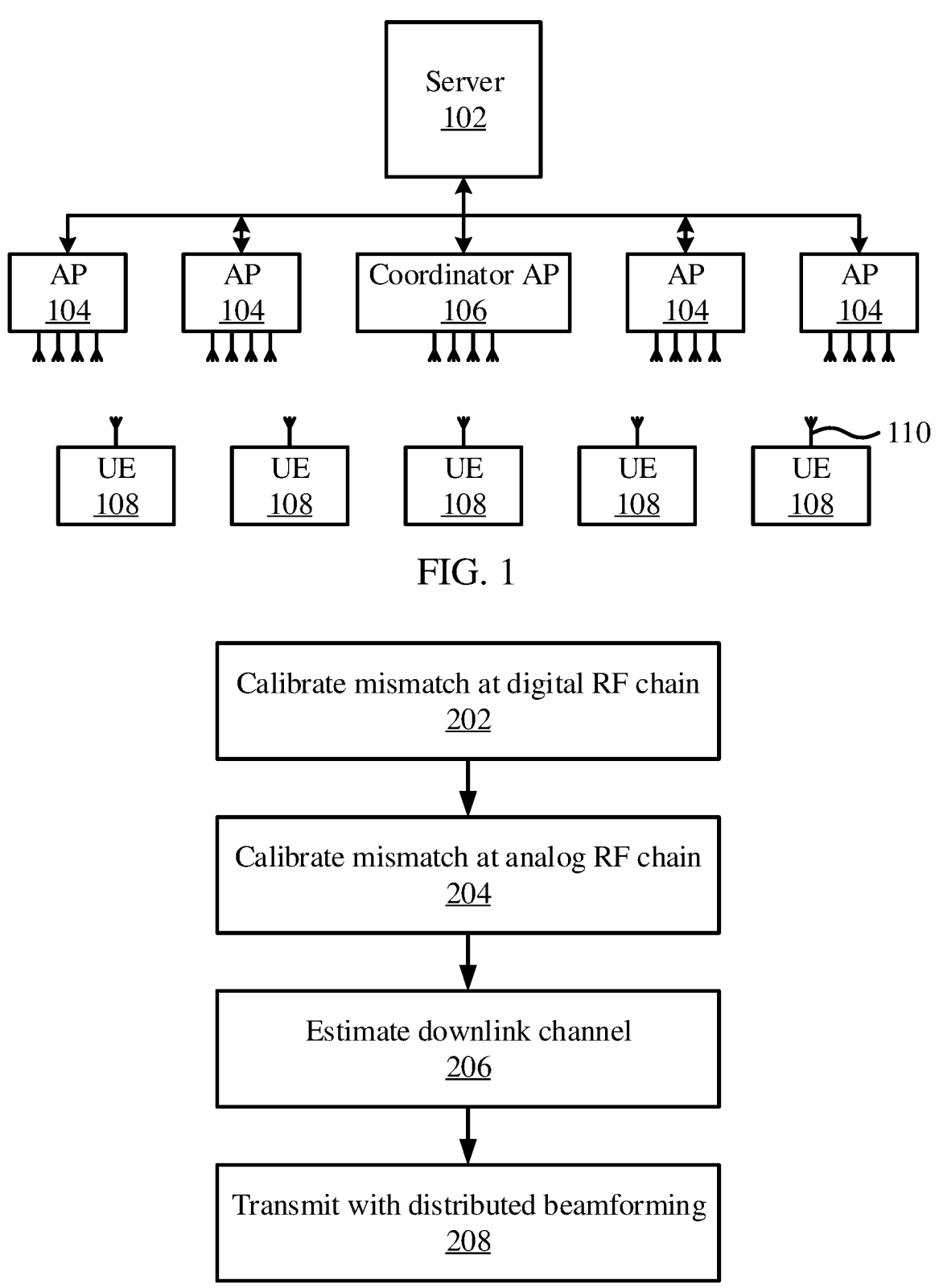
FIG. 1 is a diagram of a distributed hybrid beamforming system having multiple access points that can transmit together to user equipment, in accordance with an embodiment of the present invention.
FIG. 2 is a block/flow diagram of a method for channel estimation and distributed hybrid beamforming, in accordance with an embodiment of the present invention.

Referring now to FIG. 1, a distributed wireless communication system is shown. The system includes a server 102 that is in communication with one or more UEs 108. The UEs 108 may include any appropriate device that communicates through a wireless communications medium and protocol with one or more access points (APs) 104, including a coordinator AP 106. Each UE 108 includes one or more antennas, and each AP 104 includes multiple antennas that may be used for multiple-input-multiple-output (MIMO) wireless communications.

Massive MIMO systems may make use of large numbers of antennas 110 per AP 104 to provide extended coverage, effective beamforming, higher data rates per user, and better spectral efficiency. However, high network densities produce additional inter-cell interference effects, which negatively impact the performance of the wireless communications system. Distributed MIMO can be used to combat these effects.

In a distributed MIMO system, coordinated multi-point transmission may be used with multiple APs 104, which may be located distant from one another, cooperating to jointly serve UEs 108. Each AP 104 may have its own local transceiver and may employ any number of antennas 110. The APs are connected to a central server 102 through a wired backhaul, for example using Ethernet for communications.

To provide beamforming to UE 108 in a downlink, the APs 104 need to know the downlink channels to the UE 108. To avoid feedback overhead, the APs 104 may estimate the downlink channel if the downlink and uplink are at the same frequency. Therefore distributed MIMO systems may use time division duplexing (TDD) and orthogonal frequency division multiplexing (OFDM) to handle frequency selectivity of the channel. For efficient cooperative transmissions from multiple APs 104, however, synchronization of the timing offset, carrier frequency offset, and sampling frequency offset is needed to compensate the transmitted symbols from different APs 104, along with calibration to estimate the downlink channel based on the uplink channel.

Under a TDD scheme, each AP 104 can estimate the uplink channel using uplink pilot symbols received from the UEs 108, for example using a reciprocity-based channel estimation. However, full channel reciprocity may not hold due to non-reciprocity in the transceiver chains at the channel endpoints. To overcome this issue, calibration may be used to tune the transceivers of the APs 104. Given that bidirectional signaling between the APs 104 and the UEs 108 depends on the quality of the UE links, and that deploying cables for the sake of calibration may not be a reasonable solution for geographically diverse installations, over-the-air signaling between the APs 104 may be used.

Each AP 104 may have access only to its local clock and oscillator, and the backhaul network may not be able to provide timing and phase information at sufficient speed. Thus, the carrier frequency, sampling frequency, and time reference at each AP !04 may deviate from a nominal value or network reference. OFDM systems are furthermore vulnerable against such timing and frequency offsets.

At a receiver, the received signal is modified by a carrier frequency offset (CFO) and a timing offset (TO) that have to be estimated to retrieve the signal. In distributed systems this effect is exacerbated by each AP 104 having its own local clock and oscillator. The APs 104 therefore need to synchronize with one another to maintain a relative timing and frequency, so both timing and phase synchronization need to be performed accurately at each AP 104. Joint calibration and synchronization for a distributed MIMO system may be performed to achieve system conformation.

In the following, the operator '\' denotes the set minus operation, [b] denotes the set of all integers greater than or equal to b, $\oplus$ and $\ominus$ denote the summation and subtraction operations in a base b, and |·| denotes cardinality if applied to a set and denotes the Lebesgue measure if applied to an interval.

In a distributed MIMO system, where a cluster of cooperative multi-antenna AP 104 employ hybrid beamforming, mobile UEs 108 may be served. Hybrid beamforming includes a first-level digital beamformer and a second-level analog beamformer. Each AP 104 may be equipped with a set of $N_{ap}$ digital radio frequency (RF) chains, which are fed by the output of the digital beamformer for each transmitted stream. In turn, the output of a digital RF chain goes through an analog beamformer, which is connected to $M_{ap}$ analog RF chains. Each analog RF chain is connected to an antenna element, which may be arranged in a uniform linear array (ULA).

Analog beamformers may include phase-only vectors which are implemented by fully connected phase-shift networks (PSNs) between the output of the digital RF chains and the input of the analog RF chains. In a subarray-based structure, the output of each digital RF chain may feed a disjoint set of analog RF chains or antennas, so that the analog beamformer may have a block diagonal structure. A general analog beamformer, described herein, can treat either of the fully connected or subarray-based structures as a special case. At the UEs 108, there may be $M_{mu}$ and $N_{mu}$ analog and digital RF chains, respectively.

The APs 104 and UEs 108 may operate on any appropriate frequency, with millimeter-range wavelength (mmWave) frequencies being specifically contemplated. The mmWave channel between each AP 104 and each UE 108 may have only a few spatial clusters $L \ll N_{ap}$, $N_{mu}$, where L is the number of scattering objects in the environment that determine the number of paths between each AP 104 and each UE 108. A geometric channel model may be used that is given by:

$$H = \sqrt{\frac{N_{ap}N_{mu}}{L}} + \sum_{\ell=1}^{L} \alpha_\ell a_{mu}(\phi_\ell) a_{ap}^T(\theta_\ell)$$

where $\alpha_\ell \sim \mathcal{CN}$ $$(0, \sigma_\alpha^2)$$

is the gain of the $\ell^{\,h}$ path and $a_{mu}(\phi_\ell) \in \mathbb{C}^{N_{mu}}$ and $a_{ap}(\theta_\ell) \in \mathbb{C}^{N_{ap}}$ denote directivity vectors of the UEs 108 and the APs 104 at angles of arrival (AoA) $\phi_\ell \in [-\pi/2, \pi/2)$ to the UEs 108 and the angles of departure (AoD) $\theta_\ell \in [-\pi/2, \pi/2)$ from the APs 104.

The directivity vectors are given by:

$$a_{ap}(\theta_\ell) = \left[1, e^{-j\left(\frac{2\pi d}{\lambda}\right)sin\theta_\ell}, \ldots, e^{-j\left(\frac{2\pi d}{\lambda}\right)(N_{ap}-1)sin\theta_\ell}\right]^T$$

$$a_{mu}(\phi_\ell) = \left[1, e^{-j\left(\frac{2\pi d}{\lambda}\right)sin\backslash phi_\ell}, \ldots, e^{-j\left(\frac{2\pi d}{\lambda}\right)(N_{mu}-1)sin\phi_\ell}\right]^T$$

where λ is a carrier wavelength and d is a distance between every two adjacent antenna elements, for example set to $\lambda/2$. The effective channel between any AP 104 and UE 108 is a function of the mmWave channel and the transfer functions of the RF chains, the phase shift networks, and the analog beamformers on both sides.

The uplink (UL) and downlink (DL) channels are given by:

$$H_{DL}=R_{mu,1}B^{T}R_{mu,2}HT_{ap,2}FT_{ap,1}$$

$$H_{UL}=R_{ap,1}FR_{AP,2}H^{T}T_{mu,2}BT_{mu,1}$$

where $T_{ap,1}$, $R_{ap,1} \in \mathbb{C}^{N_{ap} \times N_{ap}}$ are the digital reciprocity matrices which denote the frequency responses of the transmit and receive digital RF chains at the AP 104, and $T_{ap,2}$, $R_{ap,2} \in \mathbb{C}^{M_{ap} \times M_{ap}}$ are the analog reciprocity calibration matrices that denote the transmit and receive frequency responses of the analog chains at the AP 104, respectively. Similarly, at the UE 108, $T_{mu,1}$, $R_{mu,1} \in \mathbb{C}^{N_{mu} \times N_{mu}}$ denote the frequency responses of the transmit and receive digital RF chains, and $T_{mu,2}$, $R_{mu,2} \in \mathbb{C}^{M_{mu} \times M_{mu}}$ are the transmit and receive frequency responses of the analog chain. These matrices are diagonal, with the diagonal elements modeling the gain and phase characteristics of each of the chain elements. The off-diagonal elements model the crosstalk between the RF hardware that is assumed to be nearly zero under proper RF design.

The transceivers may store codebooks for the hybrid beamforming task, where each codebook includes codewords that each represent a beamforming vector. The $F \in \mathbb{C}^{M_{ap} \times N_{ap}}$ and $B \in \mathbb{C}^{M_{mu} \times N_{mu}}$ are the beamforming matrices at the AP 104 and the UE 108, respectively. The matrices B and F model the beamformers that precode the input analog streams and that are then amplified and sent to the analog RF chains. Each AP 104 or UE 108 may use the same matrices for beamforming when transmitting and receiving.

The transmission in the DL and UL directions may be modeled as:

$$y_{DL}=H_{DL}x_{DL}+z_{DL}$$

$$y_{UL}=H_{UL}x_{UL}+z_{UL}$$

where $x_{DL} \in \mathbb{C}^{N_{ap}}$ and $x_{UL} \in \mathbb{C}^{N_{mu}}$ are the input streams to the digital RF chains at the AP 104 and the UE 108, respectively. These input streams may be the output of a baseband processing unit (BBU) which may, in turn, be digitally precoded symbols. In the DL direction, the AP 104 may use a digital precoder $W \in \mathbb{C}^{N_{ap} \times N_{s}}$, such that $x_{DL}=Ws$, where $s \in \mathbb{C}^{N_{s}}$ is a vector of digital symbols transmitted from the AP, and with $N_{s} \leq N_{ap}$ being the number of data streams. The terms $y_{DL} \in \mathbb{C}^{M_{mu}}$ and $y_{UL} \in \mathbb{C}^{M_{ap}}$ are the vectors of the received signal streams at the BBU in the DL and UL directions, respectively. The terms $z_{DL} \in \mathbb{C}^{M_{mu}}$ and $z_{UL} \in \mathbb{C}^{M_{ap}}$ are vectors of the additive white Gaussian noise with distributions $z_{DL} \sim \mathcal{CN}(0, \sigma_{z}^{2}I_{M_{mu}})$ and $z_{UL} \sim \mathcal{CN}(0, \sigma_{z}^{2}I_{M_{ap}})$. $I_{M_{mu}}$ is an identity matrix having a size equal to the number of antennas at the user equipment and $I_{M_{ap}}$ is an identity matrix having a size equal to the number of antennas at the access point.

The channel reciprocity calibration includes finding mismatch matrices between the hardware in the digital and analog levels of the hybrid beamformer, with the goal of modeling the mismatch between the uplink and the downlink channel.

Calibration may be performed between two nodes, S and S'. Without loss of generality, each node may be assumed to employ employs M analog RF chains and N digital RF chains. The goal is to estimate a combination of the digital and analog calibration matrices in the transmit and receive paths for both nodes in such a way that the channel estimation in one direction (e.g., transmission from the first node to the second node) can be used in the reverse direction (e.g., from the second node to the first node).

To this end, a two-step calibration process may be used, where in the first step the digital reciprocity calibration matrices are estimated and in the second step a combination of the analog reciprocity matrices is estimated. There is no sub-optimality in breaking the calibration process into two steps, and this approach takes advantage of the estimated parameters in the first step in the second step to minimize the number of pilot transmissions needed for calibration. This helps to minimize the time spent on calibration, not only to reduce the calibration overhead but also to make sure that the channel variation is negligible during the calibration process.

In the first step, the digital reciprocity calibration matrices in the transmit and receive paths for either of the nodes are estimated up to a scaling factor. Without loss of generality, the calibration parameter corresponding to the first antenna element is used as the scaling factor. In the second step, an estimate of the digital calibration matrices is used in formulating the problem of finding a combination of analog calibration matrices that are needed to benefit from channel reciprocity. This approach may be built on a particular pilot transmission and analog beamformer selection, with the aim of minimizing the number of transmissions required to perform the reciprocity calibration. During the transmission of a group of such pilots the channel, variation may be assumed to be negligible. Moreover, reciprocity calibration has to be performed periodically in order to capture the effect of variation in the properties of the elements in the analog and digital RF chains. Hence, an efficient calibration process with minimum possible time may be devised in order to reduce the overhead of the calibration.

Even during pilot transmissions, hybrid beamforming may be employed by using proper analog beamformers (i.e., transmit and receive beamformers). A proper analog beamformer may use the entire transmit antenna array, i.e., the weight corresponding to each antenna element is nonzero. This property trivially holds in the special case that the analog beamformers are implemented by a PSN. This property is important in practice to ensure good beamforming gain, as in theory one may suggest using a trivial beamformer which activates only one antenna to expedite the calibration process to a linear time based on the number of antennas. Although in an abstract theoretical analysis, such beamformers may seem to be the most efficient in terms of reducing the calibration time, in practice, an analog beamformer which uses a single antenna in average transmits (or receives) a fraction of $1/M$ power in comparison to a beamformer which uses the entire antenna array that has M antenna elements. As a result of this important practical limitation on the analog beamformers, even though the first step of the digital chain reciprocity calibration may be performed in linear time with respect to the number of digital RF chains, the second step of analog chain reciprocity calibration between two nodes may need quadratic time with respect to the number of analog RF chains, represented as the number of antenna array elements To estimate the digital transmit matrix $T_{1}$ at node S and digital receive matrix $R'_{1}$ at node S', N consecutive pilot signals may be transmitted from N different digital RF chains of node S with digital reciprocity calibration parameters $t_{1i}$, where $i=1, \ldots, N$. In all of these transmissions, an arbitrary but unique beamforming vector $f_1$ may be used. Thus, the pilot signal may be identified as $s=[s]$ and $F=f_1$. On the receiver side, the node S' receives on all its digital RF chains using the M×N beamforming matrix B that is defined as $B=[b_1, b_1, \ldots b_1]$, being made up of N vectors $b_1$. The received signal for the $i^{th}$ transmission is given by:

$$y_i' = R_1' B^T R_2' H T_2 f_1 t_{1i} s + z_{DL}, \forall\, i = 1 \ldots N$$

where $$R_1'$$

is a diagonal matrix with diagonal elements $$r_{1i}'$$

represented by the vector $$r_1' = [r_{11}', \ldots, r_{1N}'].$$

Similarly, for the diagonal matrices $T_1$, $T_2$, and $R_1$, the elements may be represented as respective sets of vectors $t_1=[t_{11}, \ldots, t_{1N}]$, $t_2=[t_{21}, \ldots, t_{2N}]$, and $$r_2' = [r_{21}', \ldots, r_{2N}'].$$

Further, a scaling factor may be defined as $$h \doteq b_1^T R_2' H T_2 f_1.$$

Therefore $$R_1' B^T R_2' H T_2 f_1 t_{1i}$$

can be estimated as:

$$\tilde{y}_i' = R_1' h t_{1i}, \forall\, i = 1 \ldots N$$

For all k, $l \in 1, \ldots N$, the relation between any $$r_{1k}' \text{ and } r_{1l}'$$

can be found as $$r_{1k}'/r_{1l}' = \tilde{y}_{ik}'/\tilde{y}_{il}'$$

through any of the N equations above, where $$\tilde{y}_{ik}'$$

is the $k^{th}$ element of the vector $\tilde{y}'$. Therefore the $$R_1'$$

matrix may be estimated up to a scaling factor. With N such noisy observations, each may result in different noisy estimates for $$R_i',$$

and similarly for $$T_i'.$$

To get a more reliable estimate of both, an optimization may be used to find first level reciprocity calibration matrices. The minimization problem may be expressed as:

$$T_1, R_1' = \operatorname{argmin} \sum_{i=1}^{N} \sum_{j=1}^{N} \left\| y_{ij}' - r_{1i}' h t_{1j} \right\|^2$$

Solving this optimization problem enables an estimate of the digital transmit matrix $T_1$ at node S and digital receive matrix $$R_1'$$

at node S' with $N^2$ observations that are achieved through N transmissions. Similarly, the digital transmit matrix $$T_1'$$

node S' and the digital receive matrix $R_1$ at node S can also be determined with N additional pilot transmissions from node S' to produce $N^2$ observations.

Having determined the matrices $$R_1, T_1, R_1', T_1'$$

up to a scaling factor, the receive and transmit matrices of the analog chain can be determined. A structured pilot transmission may be used over different digital transmit chains. Each such transmission may be received on N digital receive chains. M beamformers $f_i$ and $b_i$, i=1 . . . M, may be selected from the transmit and receive codebooks, respectively. The matrices $F=[f_1, f_2, \ldots, f_M]$ and $B=[b_1, b_2, \ldots, b_M]$ are full-rank. For each $f_i$, $$k = 0, 1, \ldots, \left\lceil \frac{M}{N} \right\rceil - 1$$

transmissions may be performed with the transmit beamformer $f_i$ from chain 1, and receive beamformers $$b_{1+k\lceil \frac{M}{N} \rceil}, b_{2+k\lceil \frac{M}{N} \rceil}, \ldots, b_{N+k\lceil \frac{M}{N} \rceil}$$

for the $k^{th}$ transmission of the beamformer $f_i$, where $b_m = b_1$ for $m > M$. Hence, after $$M\left\lceil \frac{M}{N} \right\rceil$$

transmissions, there are $M^2$ observations that may be arranged in an $M \times M$ matrix Y.

Using the model in the downlink direction:

$$y'_{ki} = R'_1 B_k^T R'_2 H T_2 f_1 t_{1i} s + z'_{ki}$$

for all $k=1, \ldots, \lceil M/N \rceil$ and $i=1, \ldots, M$, where the estimated values for $R'_1$ are computed in the last step up to a scaling factor $$r'_{11}.$$

The $j^{th}$ row of the matrix product $$R'_1 B_k \text{ for } k = 1, \ldots, \lceil M/N \rceil$$

is given by a row vector $$r'_{1j} b^T_{N(k-1)+j} = r'_{11}(r'_{1j}/r'_{11})b^T_{N(k-1)+j} \doteq r'_{11} \tilde{b}^T_m,$$

where $m=N(k-1)+j$. Stacking the row vectors $$\tilde{b}^T_m$$

for $m=1, \ldots, M$ results in an $M \times M$ matrix $\tilde{B}$. Considering F as being made up of M transmit beamforming vectors and the modified received beamforming vectors in $\tilde{B}$, the aggregate $M \times M$ observation matrix is:

$$Y' = r'_{11} \tilde{B}^T R'_2 H T_2 F t_{11} s' + Z'$$

In a similar fashion, the matrix for the uplink direction is:

$$Y = r_{11} \tilde{F}^T R_2 H^T T'_2 B t'_{11} s + Z$$

Let $\tilde{Y}'$ and $\tilde{Y}$ be the estimation of $$r'_{11} \tilde{B}^T R'_2 H T_2 F t_{11} \text{ and } r_{11} \tilde{F}^T R_2 H^T T'_2 B t'_{11},$$

respectively. The following two observations are generated:

$$\tilde{H}_1 = (r'_{11} t_{11})^{-1} R'_2{}^{-1} \tilde{B}^{-T} \tilde{Y}' F^{-1} T_2^{-1}$$

$$\tilde{H}_2 = (r_{11} t'_{11})^{-1} T_2^{-1} B^{-T} \tilde{Y}^T \tilde{F}^{-1} R_2^{-1}$$

Defining $X \doteq \tilde{B}^{-T} \tilde{Y}' F^{-1}$ and $Z \doteq B^{-T} \tilde{Y}^T \tilde{F}^{-1}$, where $X$, $Z \in \mathbb{C}^{M \times M}$ are completely known. The elements of the X and Z matrices may be written as $x_{ij}$ and $z_{ij}$, respectively for all $i,j=1, \ldots, M$. Then:

$$\frac{\tilde{h}_{1,ij}}{\tilde{h}_{2,ij}} = \frac{x_{ij} r'_{2i}{}^{-1} t'_{2j}{}^{-1}}{z_{ij} t'_{2i}{}^{-1} r'_{2j}{}^{-1}} \cdot \frac{r'_{11}{}^{-1} t_{11}^{-1}}{t'_{11}{}^{-1} r_{11}^{-1}} \approx 1 \; \forall i, j = 1, \ldots, M$$

Defining $$\beta = r'_{11}{}^{-1} t_{11}^{-1}/t'_{11}{}^{-1} r_{11}^{-1}, \alpha_i = r_{2i} t_{2i}^{-1}, \text{ and } \alpha'_i = r'_{2i} t'_{2i}{}^{-1}$$

produces:

$$\frac{\alpha_j}{\alpha'_i} \approx \beta \frac{z_{ij}}{x_{ij}}$$

This means that, given $\alpha_1$, all $\alpha_i$ and $\alpha'_i$ can be determined based on a single scaling factor. The product $$R_2 T_2^{-1}$$

is a diagonal matrix where the diagonal elements are given by $[\alpha_1, \ldots \alpha_M]$. Similarly, $$R'_2 T'_2{}^{-1}$$

follows a diagonal structure with diagonal elements $$[\alpha'_1, \ldots \alpha'_M].$$

To minimize the estimation error, the estimate of each fraction is not performed individually. The problem may be formulated as a joint least square optimization, which involves all fractions to get the best estimates of the second-level calibration matrices.

The second-level analog chain matrices can be found as the solution to the following least-square optimization problem:

$$\{\alpha_i, \alpha'_i\}_{i=1}^M = \arg \min_{\alpha_i, \alpha'_j, i, j \in [M]} \sum_{i=1}^M \sum_{j=1}^M \left\| x_{ij} \alpha_j - \beta z_{ij} \alpha'_i \right\|^2$$

Having found the best estimates of $\alpha_i$ and $\alpha'_i$, the mismatch calibration matrices $$R_2 T_2^{-1} \text{ and } R'_2 T'^{-1}_2$$

can be formed and determined up to a scaling factor as the second-level calibration matrices.

The reciprocal tandem of a receive beamformer $f$ at a communication node with the receive analog RF chain calibration matrix $R_2$ and the transmit analog RF calibration matrix $T_2$ is given by $$\check{f} = R_2 T_2^{-1} f.$$

Alternatively, the reciprocal tandem may be defined as a pair of transmit and receive beamformers used in transmission and reception by the same node, which allows reciprocity to hold in spite of a mismatch between the transmit and receive analog RF chains. Using either definition, a tandem pair is defined per node and depends on the analog calibration matrices, with no dependency on the channel or other possible mismatch of calibration parameters at the other nodes.

Based on the definition of the reciprocal tandem of a receive beamformer, a reciprocal tandem of a transmit beamformer $f$ is given by $$\check{f} = \left( R_2 T_2^{-1} \right)^{-1} f.$$

If $F$ is a matrix, its reciprocal tandem $\check{F}$ is the same size matrix, where each column is the reciprocal tandem of the corresponding column of $F$.

Reciprocal tandem pairs can be used to estimate the channel, design faster and more efficient channel estimation, and calibrate between multiple APs. The goal of the reciprocity calibration is to find the downlink channel estimate based on the uplink channel estimation using pilot signals transmitted by the users. Each of the calibration matrices $$R_1, T_1, R'_1, T'_1, R_2 T_2^{-1}, \text{ and } R'_2 T'^{-1}_2$$

can be estimated up to a scaling factor. This information will help to estimate the downlink channel by utilizing the estimates of the uplink channel. DL channel estimation for a single AP is based on the uplink channel estimation for a single AP. This analysis may be extended to the case of multiple APs.

Using $F_{mu}$ as the transmit beamformer at the AP 104 and $B_{mu}$ as the receive beamformer at the UE 108 in the DL direction, and similarly using $B_{bs}$ as the transmit beamformer at the UE 108 and $F_{bs}$ as the receive beamformer at the AP 104 in the UL direction the signal model at the MU and the AP is given by, $$Y_{mu} = R'_1 B_{mu}^T R'_2 H T_2 F_{mu} T_1 s + Z_{mu}$$

$$Y_{ap} = R_1 F_{ap}^T R_2 H^T T'_2 B_{ap} T'_1 s + Z_{ap}$$

Since the digital calibration matrices are known up to a scaling factor, the problem reduces to finding the effective DL channel $$H_{DL}^{eff} \doteq R'_2 H T_2$$

based on observations of $Y_{ap}$ which involves the effective uplink channel $$H_{UL}^{eff} \doteq R_2 H^T T'_2.$$

This leads to the effective DL channel matrix in terms of the effective UL channel matrix as $$H_{DL}^{eff} = (R'_2 T'_2) \left( H_{UL}^{eff} \right)^T \left( R_2 T_2^{-1} \right)^{-1}$$

In the UL direction, $M_{mu} \lceil M_{ap}/N_{ap} \rceil$ pilot transmissions may be used to generate $M_{ap} M_{mu}$ observations. Following the same sequel, the uplink direction can be written as $$Y = r_{11} \tilde{F}^T R_2 H^T T'_2 B t'_{11} s + Z.$$

where $B$ includes $M$ transmit beamforming vectors used by UE 108 each in separate transmission in one row to get an $M \times M$ matrix and where $\tilde{F}^T$ includes the transpose of the modified received beamforming vectors in one column to get an $M \times M$ matrix. The $M$ transmit beamforming vectors and the $M$ receive beamforming vectors are chosen such that $B$ and $F$ (and hence, $\tilde{F}$) are invertible.

Letting $\check{Y}$ be the estimation of $$r_{11} \tilde{F}^T R_2 H^T T'_2 B t'_{11},$$

the effective uplink channel matrix can be written as $$H_{UL}^{eff} = \left( \left( r_{11} \tilde{F}^T \right)^{-1} \check{Y} (B t'_{11})^{-1} \right)^T$$

The second step of the calibration process described above may be performed between the AP 104 and UE 108 to estimate the channel, even if the calibration matrices $$R_1, T_1, R_2 T_2^{-1}$$

for both nodes AP 104 and UE 108 are already known. This is due to the fact that either of the effective DL or UL channel is $M_{ap} M_{mu}$ dimensional, needing least $M_{ap} M_{mu}$ observations of these parameters.

A channel estimation scheme may be based on the concept of reciprocal tandem. In most practical settings, the AP 104 usually intends to transmit only one or at most a few data streams to each UE 108. Hence, the considerable overhead of full channel estimation may outweigh the benefit of beamforming in some cases. One may use the reciprocal tandem to perform an efficient estimation of the downlink channel and considerably reduce the overhead. For example, if the MU is using hybrid beamforming and intends to receive the data stream from AP 104 using the receive beamformer b, it can send the uplink pilots using the reciprocal tandem $\check{b}$ as the transmit beamformer. Meanwhile, the AP 104 will use a receive beamforming matrix $F^T$ and estimate the 1×N uplink channel for each of the receive beamforming vector in $F^T$. As a result, it can find the N×1 downlink channel for the transmit vectors that are the reciprocal tandem of its receive beamforming vectors. More generally, if UE 108 transmits K≤N pilot signals, one for each one of the first K digital RF chains, say, with calibration parameters $$r'_{11}, r'_{12}, \ldots, r'_{1K} \text{ and } t'_{11}, t'_{12}, \ldots, t'_{1K}$$

using beamformers $b_1, b_2, \ldots, b_K$, respectively, and the AP receives in all its digital RF chains with beamforming matrix F the collection of the received signals can be written as $$Y_{ap} = R_1 F^T R_2 H^T T'_2 B[T'_1]_K s + Z$$

where B=[$b_1, b_2, \ldots, b_K$], $[X]_K$ is an operator which returns a square matrix of the first K columns and rows of X, Z is the additive noise, and s is the vector transmitted pilot symbols. While F and B cannot be inverted to estimate the effective UL channel, one can estimate $$\tilde{Y}_{ap} \doteq R_1 F^T R_2 H^T T'_2 B[T'_1]_K$$

and write:

$$[R'_1]_K [T'_1]_K^{-1} \tilde{Y}_{ap}^T R_1^{-1} T_1 = [R'_1]_K B^T (R'_2 T'_2) R'_2 H T_2 (R_2 T_2^{-1}) F T_1$$

Comparing with the DL Signal Model $$Y_{mu} = [R'_1]_K \check{B}^T R'_2 H T_2 \check{F} T_1 s + Z$$

this is equivalent of having the channel estimate for the DL if the reciprocal tandem $\check{B}$=

$$(R'_2 T'_2) B \text{ and } \check{F} = (R_2 T_2^{-1}) F$$

are used by the MU for the reception and by the AP for the transmission, respectively.

Effectively, this may be observed as estimating the downlink as an $N_{ap}$×K channel from $N_{ap}$ virtual antennas at the AP 104, one for each corresponding analog transmit beamforming vectors to K virtual receive antenna at the UE 108, one for each corresponding received beamforming vector $b_i$, i=1, ..., K. The estimated channel can then be used to select a virtual antenna with maximum channel gain, or even perform a digital beamforming by combining multiple virtual antennas through a digital transmit beamforming vector.

Using the concept of reciprocal tandem, the overhead of the channel estimation from $M_{mu} \lceil M_{ap}/N_{ap} \rceil$ pilot transmissions can be reduced to only K pilot transmission at the expense of estimating a $N_{ap}$×K virtual channel instead of $M_{ap}$×$M_{mu}$ channel. Moreover, one needs to use the reciprocal tandem of the receive and transmit beamforming vectors that are used for channel estimation in the uplink as the transmit and receive beamformers during the data transmission in the downlink, respectively.

Contrary to the case of beamforming from a single AP 104, where achieving the calibration between the UE 108 and the AP 104 was enough to obtain the downlink channel estimate, when multiple APs 104 co-operate towards jointly serving a UE 108, a third calibration step may be performed between the co-operative APs 104 in addition to the two calibration steps set forth above.

Two APs 104, AP1 and AP2, may co-operate towards serving a generic UE 108. The extension of the results to the case of multiple APs 104 is straightforward. Suppose each of the APs 104 estimates its DL channel to the UE 108 separately, by performing calibration between the AP 104 and the UE 108. Since the calibration matrices are only known up to a scaling factor, the DL received signal model between each AP and the UE 108 is given by, $$y_{DL,1} = c_1 H_{DL,1} s + z_{DL,1}$$

$$y_{DL,2} = c_2 H_{DL,2} s + z_{DL,2}$$

where $c_1$ and $c_2$ are the unknown coefficients of the estimated downlink channel between $AP_1$, $AP_2$, and the user, respectively. The overall downlink channel from both APs 104 is obtained by collecting all the column vectors of $c_1 H_{DL,1}$ and $c_2 H_{DL,2}$ into a single channel matrix $H_{DL}$= [$c_1 H_{DL,1}$, $c_2 H_{DL,2}$]. In general the coefficients $c_1$ and $c_2$ are unknown and uncorrelated parameters. Therefore, in order to perform cooperative beamforming, the ratio $c_2/c_1$ may be estimated. Thus, $$c_1 = r_{11}^{mu} t_{11}^1 \sigma_2^{mu} (\sigma_2^1 t_{11}^{mu} r_{11}^1)^{-1}$$

$$c_2 = r_{11}^{mu} t_{11}^2 \sigma_2^{mu} (\sigma_2^2 t_{11}^{mu} r_{11}^2)^{-1}$$

where $$r_{11}^{mu}, t_{11}^{mu}, \text{ and } \sigma_2^{mu}$$

are the unknown scaling factors (embedded in the first elements) of the calibration matrices $$R_1^{mu}, T_1^{mu}, \text{ and } R_2^{mu}(T_2^{mu})^{-1}$$

for the UE 108. Similarly, $$r_{11}^k, t_{11}^k, \text{ and } \sigma_2^k$$

are the unknown scaling factors (embedded in the first elements) of the calibration matrices $$R_1^k, T_1^k, \text{ and } R_2^k (T_2^k)^{-1}$$

for the k-th AP, k=1, 2. Defining $c \doteq c_1/c_2$, $$c = \frac{r_{11}^{mu} t_{11}^{1} \sigma_2^{mu} (\sigma_2^{1} t_{11}^{mu} r_{11}^{1})^{-1}}{r_{11}^{mu} t_{11}^{2} \sigma_2^{mu} (\sigma_2^{2} t_{11}^{mu} r_{11}^{2})^{-1}}$$

$$= \frac{t_{11}^{1} (\sigma_2^{1} r_{11}^{1})^{-1}}{t_{11}^{2} (\sigma_2^{2} r_{11}^{2})^{-1}}$$

It is observed that the coefficient c is not a function of the calibration parameters of the MU and only depends on the calibration parameters of the APs. Suppose the two-step calibration process between the APs is performed and the two APs have estimated the calibration matrices up to a scaling factor. The coefficient c can be obtained by taking a third step in the calibration process. In the following, employing the notion of reciprocal tandem may facilitate estimation of this ratio efficiently by only two pilot transmissions, one from each AP 104.

$$AP_1$$

transmits a pilot signal from its first digital RF chain using the beamforming vector $$f_1^1$$

that is received by $AP_2$ on its first digital RF chain using beamforming vector $$b_1^2.$$

In the reverse direction, $AP_2$ transmit a pilot signal from its first digital RF chain using $$b_2^2$$

which is the scaled version of the reciprocal tandem of $$b_1^2$$

and $AP_1$ receives the signal in its first digital RF chain using the beamforming vector $$f_2^1$$

which is the scaled version of the reciprocal tandem of $$f_1^1.$$

Since $$R_2^2 (T_2^2)^{-1}$$

is known up to an scaling factor, the scaling factor is taken as its first elements of the diagonal which is denoted by $$\sigma_2^2$$

and hence the estimated matrix can be written as $$R_2^2 (T_2^2)^{-1} / \sigma_2^2.$$

As a result, $$b_2^2 = (\sigma_2^2)^{-1} \tilde{b}_1^2 = (\sigma_2^2)^{-1} R_2^2 (T_2^2)^{-1} b_1^2$$

can be determined. Similarly, $$f_2^1 = (\sigma_2^1) \tilde{f}_1^1 = ((\sigma_2^1)^{-1} R_2^1 (T_2^1)^{-1})^{-1} f_1^1$$

can be determined. Let us denote end-to-end channel the first digital RF chains from $AP_k$ to $AP_l$ by $\tilde{y}_{kl}$. Thus, $$\tilde{y}_{12} = r_{11}^2 (b_1^2)^T R_2^2 H T_2^1 f_1^1 t_{11}^1$$

$$\tilde{y}_{21} = r_{11}^1 (f_2^1)^T R_2^1 H^T T_2^2 b_2^2 r_{11}^2$$

Transposing the right-hand side of $\tilde{y}_{21}$ and replacing $$\tilde{b}_2^2$$

and $$f_2^{(1)}$$

with their equivalent values, $\tilde{y}_{21}$ can be rewritten as:

$$\tilde{y}_{21} = t_{11}^2 (\sigma_2^2)^{-1} (b_1^2)^T R_2^2 H T_2^1 \sigma_2^1 f_1^1 r_{11}^1$$

Using the ratio of the scalar observations $\tilde{y}_{12}$ and $\tilde{y}_{21}$ produces $$\tilde{y}_{12}/\tilde{y}_{21} = \frac{t_{11}^1(\sigma_2^1)^{-1}(r_{11}^1)^{-1}}{t_{11}^2(\sigma_2^2)^{-1}(r_{11}^2)^{-1}}$$

which can be used to estimate the parameter c. This analysis can be extended to its most general form, to the case where there are K>2 APs 104 that are co-operating towards a joint beamforming task to serve a generic UE 108. The overall downlink channel is given by $H_{DL}=[c_1 H_{DL,1}, c_2 H_{DL,2}, \ldots, c_K H_{DL,K}]$. To estimate the DL channel properly, one AP may be set as the reference for calibration, such that all the other APs 104 will calibrate their hardware jointly with the reference AP. The reference AP may be identified as coordinator AP 106, and may have the same hardware as the other APs 104, or may have different hardware/capabilities.

Without loss of generality, assume $AP_1$ is picked as the the reference AP and the first calibration is made between APs, $AP_1$ and $AP_2$ following the same process as carried out in section III. Considering all the APs 104 may employ N digital RF chains and M antennas, the first calibration will be done via $M^2$ observations with the time complexity of $2N+2M\lceil M/N \rceil$. After the first calibration is made both $AP_1$ and $AP_2$, their calibration matrices may be obtained. Next, the reciprocal tandem property is used to show each of the other K−1 calibrations can be achieved with the time complexity that is linear in the number of analog and digital RF chains.

The calibration of the $k^{th}$ AP with the reference AP, i.e $AP_1$ uses calibration matrices $R_1$, $T_1$, and $$R_2 T_2^{-1},$$

which are known up to a scaling factor at the time of calibrating $AP_k$ as these values are already estimated when jointly calibrating $AP_1$ and $AP_2$. The calibration matrices of the digital chain in $AP_k$ may be estimated using N transmissions. A different process may be used to estimate the analog chain. $AP_1$ uses the transmit beamforming vector f on the first digital chain $t_{11}$ and makes $\lceil M/N \rceil$ transmissions. $AP_k$ uses the receive beamforming matrix $B_i$, i=1 . . . $\lceil M/N \rceil$ in the i-th transmission. Stacking all the observations produces $$\tilde{y}_{1k} = t_{11} R_1^k B^T R_2^k H T_2 f$$

where $B=[B_1, B_2, \ldots, B_{\lceil M/N \rceil}] \in \mathbb{C}^{M \times M}$. In the reverse direction, $AP_k$ uses the columns of matrix B to perform M transmission. In each transmission $AP_1$ uses the receive beamforming vector $\check{f}=(R_2 T_2)^{-1}f$, i.e. the reciprocal tandem of the beamforming vector f. This produces $$\tilde{y}_{k1} = r_{11}\check{f}^T R_2 H^T T_2^k B T_1^k$$

Transposing the last equation will give, $$\tilde{y}_{k1}^T = r_{11}T_1^k B^T T_2^k H T_2 \check{f}^T R_2$$

This leads to:

$$T_2^k H T_2 f = r_{11} B^{-T}(T_1^k)^{-1} \tilde{y}_{1k}^T$$

$$R_2^k H T_2 f = t_{11}^{-1} B^{-T}(R_1^k)^{-1} \tilde{y}_{k1}^T$$

Next, suppose $H^T=[h_1, h_2, \ldots, h_M]$. Therefore, $$T_2^k H T_2 f \quad \text{and} \quad R_2^k H T_2 f$$

can be rewritten as $$\begin{pmatrix} t_{21}^k h_1^T T_2 f \\ t_{22}^k h_2^T T_2 f \\ \cdot \\ \cdot \\ \cdot \\ t_{2M}^k h_M^T T_2 f \end{pmatrix} = \begin{pmatrix} r_{21}^k h_1^T T_2 f \\ r_{22}^k h_2^T T_2 f \\ \cdot \\ \cdot \\ \cdot \\ r_{2M}^k h_M^T T_2 f \end{pmatrix}$$

The analog chain calibration matrices for $AP_k$ can be readily computed. This implies that, when the reference AP is already calibrated, then the calibration of each of the other APs can be achieved in linear time with respect to the number of RF chains at each AP with an additional N+M+ $\lceil M/N \rceil$ pilot transmissions per each AP.

Evaluating the performance of our channel reciprocity calibration procedure by means of extensive numerical simulations, two experiments may be considered. In the first experiment, the outcome of the channel reciprocity calibration is measured between two arbitrary multi-antenna nodes. In the second experiment, the effect of reciprocity calibration on the performance of the co-operative hybrid beamforming is demonstrated under different circumstances.

Referring now to FIG. 2, a method of performing distributed beamforming is shown. As described above, block 202 calibrates the mismatch at the digital RF chain between the uplink and downlink paths, for example between digital-to-analog converters and analog-to-digital converters, determining mismatch coefficients up to a constant scaling factor. Block 204 calibrates the mismatch in the analog RF chain between the uplink and downlink paths, for example between the power amplifier (PA) and low-noise amplifier (LNA), determining a mismatch coefficient. The channel reciprocity calibration may be formulated as a least-square optimization problem that can be efficiently solved using, e.g., alternative optimization.

Block 206 then estimates the downlink channel based on uplink pilot transmissions using the mismatch coefficients obtained during calibration. It should be understood that this may be reversed, with downlink pilot transmissions being used to estimate the uplink channel. Using the estimated downlink channel across multiple APs 104, block 208 performs a transmission using distributed beamforming.

Referring now to FIG. 3, pseudo-code for digital chain calibration (e.g., block 202) is shown. Beamformer information is used to send pilot signal signals between an AP 104 and a UE 108, generating digital calibration matrices.

Referring now to FIG. 4, pseudo-code for analog chain calibration (e.g., block 204) is shown. The digital calibration matrices are used to send pilot signals between the AP 104 and the UE 108, generating analog calibration matrices.

Figure 5:
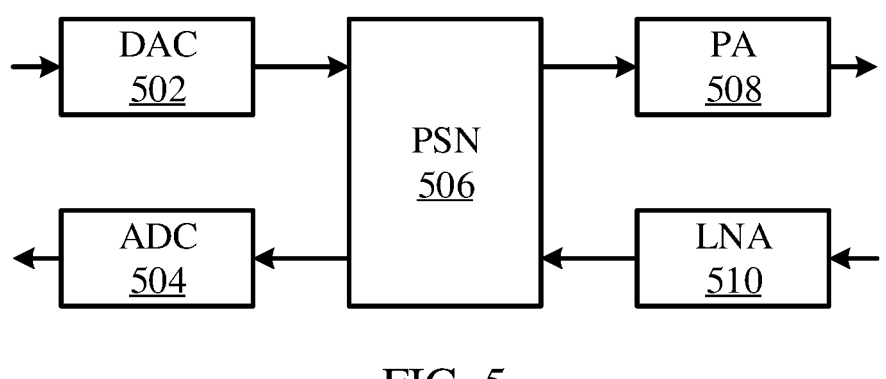
FIG. 5 is a block/flow diagram of a hybrid beamforming system, illustrating digital and analog components on both the send and receive side, in accordance with an embodiment of the present invention.

Referring now to FIG. 5, an exemplary hybrid beamforming architecture is shown, which may be used in an AP 104 or in a UE 108. On a transmission path, a digital signal is processed by a digital-to-analog converter (DAC), where it is converted to an analog signal. The analog signal is processed by a PSN 506 according to a beamforming pattern, before being amplified by power amplifier (PA) 508. The signal from the PA 508 is then transmitted on an antenna.

On a receive path, an analog signal is collected by an antenna and is amplified by low-noise amplifier (LNA) 510. The amplified received signal is then phase shifted in the PSN 506 according to a beamforming pattern. An analog-to-digital converter (ADC) 504 then converts the phase-shifted, amplified received signal to a digital domain, where it can be passed to downstream processing.

The DAC 502 and the ADC 504 make up the digital domain of the hybrid beamforming system. Because the operation of the DAC 502 and the ADC 504 may not be perfectly reciprocal, this digital mismatch is subject to the calibration process described above. Similarly the PA 508 and LNA 510 make up the analog domain of the hybrid beamforming system. Because the operation of the PA 508 and the LNA 510 may not be perfectly reciprocal, this analog mismatch is subject to the calibration process described above.

Hybrid beamforming involves adjusting signals in both the digital and analog domains. The output of the first-stage digital beamformer passes through $N_{ap}$ digital RF chains before being fed to the second-stage analog beamformer, with $M_{ap}$ analog RF chains connected to respective antenna elements.

Calibration may be performed periodically as the parameters associated with the components in RF chains change over time or based on the operating points. A beam search may be used in hybrid beamforming, particularly in higher frequency bands such as millimeter wave bands, due to generate high gain and sharp beams. The beam search may be combined with the signaling that is used for calibration.

During the analog chain calibration process (block 204), a transmitting node sends pilot signals through M analog beamformers and the receiver uses its N digital RF chains to receive the pilot signals in groups of N pilot signals using N analog receive beamformers. For the calibration process, the set of analog transmit beamformers are chosen such that they are linearly independent. It is indeed possible to select the set of beamformers such that they cover different angular intervals while they are linearly independent. Hence, using all received signals, the receiver can estimate a transmit beams which maximizes the received gain or signal to noise ratio (SNR) as well as the received analog beam (or analog combiner) which maximizes the receive beamforming (or combining) gain. In particular Y' in Step 8 of FIG. 4 contains the information to find the optimized analog transmit beamformer and analog receive beamformer.

The estimation process can be further improved by jointly using both Y' and Y at the end of the two-way calibration process. It should be pointed out that indeed the precision of the calibration parameters depends on the SNR of the received signal for different pairs of transmit and receive beamformers. The higher the SNR between a pair of transmit and receive beamformer, the better the estimate of the associated calibration parameters. Nonetheless, the calibration parameters depend of the entire set of the received signal and the effect of the low SNR link is averaged out. Nonetheless, in order to improve the precision of the calibration process, it is possible to select only the pairs of transmit and receive analog beams for which the SNR of the associated link is above a threshold. This can be done only based on one way transmission, for example, based on the signal Y' in Step 8 of FIG. 4. Next, one can choose perturbation of the chosen analog transmit beamformers to generate a set of full rank transmit beamformers F in Step 8 of FIG. 4. The perturbation aims to only slightly affect the beamforming pattern in order to keep the SNR of the links above the given threshold. The same process can be used on the receive analog beamformers.

Referring now to FIG. 6, pseudo-code for combining calibration across multiple nodes is shown. For example, Node 1 can perform the analog chain calibration process with node 2 and node 3 at the same time. Node 1 transmits pilot signals using M analog transmit beamformers and both Node 2 and 3 collect the received signals using groups of N receive beamformers and generate Y' and Y". In the uplink direction Node 2 and Node 3 separately transmit pilots using M transmit beamformers (used for the reception in the previous step while Node 1 was transmitting) one by one and the received signals are used to generate Y2 and Y3, respectively. The optimization problem is now posed as sum of two least square objective function which share the parameters of the Node 1. By solving the combined optimization problem the estimation of the calibration parameters in improved especially when the Node 2 and Node 3 are not in the same beamforming direction.

Figure 7:
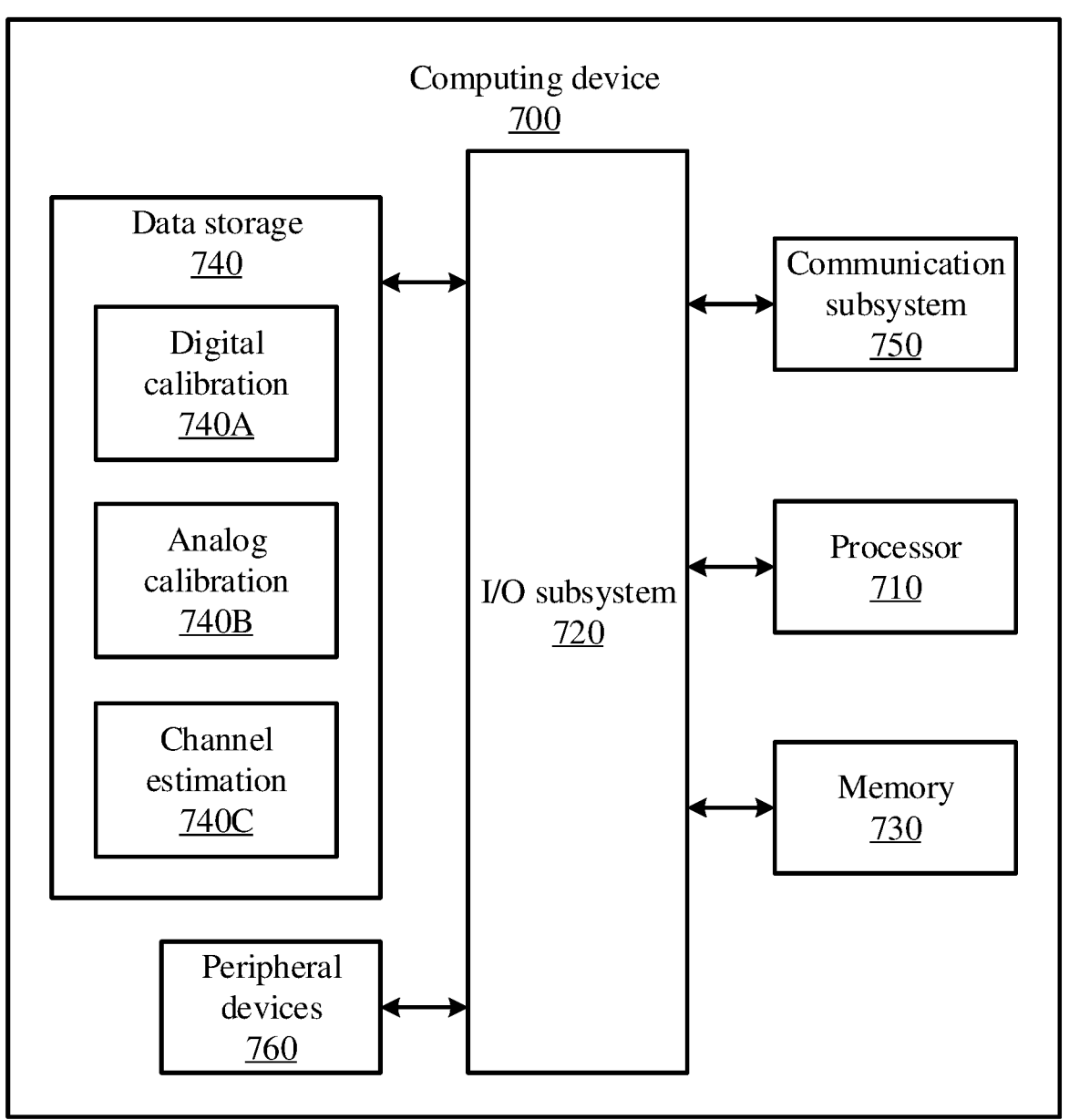
FIG. 7 is a computer system that can perform digital and analog RF chain calibration and that can estimate a channel, in accordance with an embodiment of the present invention.

Referring now to FIG. 7, an exemplary computing device 700 is shown, in accordance with an embodiment of the present invention. The computing device 700 is configured to control hybrid beamforming.

The computing device 700 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 700 may be embodied as one or more compute sleds, memory sleds, or other racks, sleds, computing chassis, or other components of a physically disaggregated computing device.

As shown in FIG. 7, the computing device 700 illustratively includes the processor 710, an input/output subsystem 720, a memory 730, a data storage device 740, and a communication subsystem 750, and/or other components and devices commonly found in a server or similar computing device. The computing device 700 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 730, or portions thereof, may be incorporated in the processor 710 in some embodiments.

The processor 710 may be embodied as any type of processor capable of performing the functions described herein. The processor 710 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 730 may be embodied as any type of volatile or non-volatile memory or data storage capable of performing the functions described herein. In operation, the memory 730 may store various data and software used during operation of the computing device 700, such as operating systems, applications, programs, libraries, and drivers. The memory 730 is communicatively coupled to the processor 710 via the I/O subsystem 720, which may be embodied as circuitry and/or components to facilitate input/output operations with the processor 710, the memory 730, and other components of the computing device 700. For example, the I/O subsystem 720 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 720 may form a portion of a system-on-a-chip (SOC) and be incorporated, along with the processor 710, the memory 730, and other components of the computing device 700, on a single integrated circuit chip.

The data storage device 740 may be embodied as any type of device or devices configured for short-term or long-term storage of data such as, for example, memory devices and circuits, memory cards, hard disk drives, solid state drives, or other data storage devices. The data storage device 740 can store program code 740A for digital calibration, 740B for analog calibration, and/or 740C for channel estimation. Any or all of these program code blocks may be included in a given computing system. The communication subsystem 750 of the computing device 700 may be embodied as any network interface controller or other communication circuit, device, or collection thereof, capable of enabling communications between the computing device 700 and other remote devices over a network. The communication subsystem 750 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 700 may also include one or more peripheral devices 760. The peripheral devices 760 may include any number of additional input/output devices, interface devices, and/or other peripheral devices. For example, in some embodiments, the peripheral devices 760 may include a display, touch screen, graphics circuitry, keyboard, mouse, speaker system, microphone, network interface, and/or other input/output devices, interface devices, and/or peripheral devices.

Of course, the computing device 700 may also include other elements (not shown), as readily contemplated by one of skill in the art, as well as omit certain elements. For example, various other sensors, input devices, and/or output devices can be included in computing device 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 700 are readily contemplated by one of ordinary skill in the art given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A transmission method, comprising:
calibrating a mismatch between uplink and downlink digital elements of a plurality of hybrid beamforming transceivers;
calibrating a mismatch between uplink and downlink analog elements of the plurality of hybrid beamforming transceivers;

estimating respective downlink channels between a user equipment and the plurality of hybrid beamforming transceivers using respective mismatch calibrations for the digital and analog elements of each of the plurality of hybrid beamforming transceivers, including determining a reciprocal tandem of a receive beamformer as a pair of transmit and receive beamformers used in transmission and reception by a same hybrid beamforming transceiver; and
transmitting data to the user equipment from the plurality of hybrid beamforming transceivers using a distributed beamforming pattern based on the estimated downlink channels.

2. The method of claim 1, wherein the digital elements include a digital-to-analog converter on a transmit path and an analog-to-digital converter on a receive path.

3. The method of claim 1, wherein the analog elements include a power amplifier on a transmit path and a low-noise amplifier on a receive path.

4. The method of claim 1, wherein estimating the downlink channels includes determining uplink channels based on a pilot transmission from the user equipment.

5. The method of claim 1, wherein estimating the downlink channels includes determining phase shifts and gain differences between the plurality of hybrid beamforming transceivers.

6. The method of claim 1, wherein the reciprocal tandem of a beamformer f is given by:

$$\check{f} = \left( R_2 T_2^{-1} \right)^{-1} f$$

where $R_2$ and $T_2$ are analog calibration matrices of a given hybrid beamforming transceiver.

7. A transmission system, comprising:
a transceiver;
a hardware processor; and
a memory that stores a computer program which, when executed by the hardware processor, causes the hardware processor to:
calibrate a mismatch between uplink and downlink digital elements of the transceiver;
calibrate a mismatch between uplink and downlink analog elements of the transceiver;
estimate respective a downlink channel between a user equipment and the transceiver using the mismatch calibrations for the digital and analog elements of the transceiver, including determination of a reciprocal tandem of a receive beamformer as a pair of transmit and receive beamformers used in transmission and reception by a same hybrid beamforming transceiver; and
transmit data to the user equipment with the transceiver, using a beamforming pattern based on the estimated downlink channel.

8. The system of claim 7, wherein the transceiver includes a digital-to-analog converter on a transmit path and an analog-to-digital converter on a receive path.

9. The system of claim 7, wherein the transceiver includes a power amplifier on a transmit path and a low-noise amplifier on a receive path.

10. The system of claim 7, wherein the computer program causes the hardware processor to determine an uplink channel based on a pilot transmission from the user equipment.

11. The system of claim 7, wherein the computer program causes the hardware processor to determine a phase shift and a gain difference between the transceiver and a transceiver of another transmission system.

12. The system of claim 7, wherein the reciprocal tandem of a beamformer f is given by:

$$\check{f} = \left(R_2 T_2^{-1}\right)^{-1} f$$

where $R_2$ and $T_2$ are analog calibration matrices of a given hybrid beamforming transceiver.

13. A hybrid beamforming accesses point, comprising:
a transceiver that includes a transmit path with a digital-to-analog converter and a power amplifier and a receive path with a low-noise amplifier and an analog-to-digital converter;
a hardware processor; and
a memory that stores a computer program which, when executed by the hardware processor, causes the hardware processor to:
calibrate a mismatch between uplink and downlink digital elements of the transceiver;
calibrate a mismatch between uplink and downlink analog elements of the transceiver;
estimate respective a downlink channel between a user equipment and the transceiver using the mismatch calibrations for the digital and analog elements of the transceiver, including determination of a reciprocal tandem of a receive beamformer as a pair of transmit and receive beamformers used in transmission and reception by a same hybrid beamforming transceiver; and
transmit data to the user equipment with the transceiver, using a beamforming pattern based on the estimated downlink channel that coordinates with other hybrid beamforming access points to form a distributed beam pattern.

14. The hybrid beamforming access point of claim 13, wherein the computer program causes the hardware processor to determine a phase shift and a gain difference between the transceiver and a transceiver of another transmission system.

15. The hybrid beamforming access point of claim 13, wherein the reciprocal tandem of a beamformer f is given by:

$$\check{f} = \left(R_2 T_2^{-1}\right)^{-1} f$$

where $R_2$ and $T_2$ are analog calibration matrices of a given hybrid beamforming transceiver.

* * * * *